(12) United States Patent
Rotem

(10) Patent No.: US 12,392,857 B2
(45) Date of Patent: Aug. 19, 2025

(54) REMOTE RADIO DIRECTION FINDER AND IDENTIFIER

(71) Applicant: EUREKA PRO TECHNOLOGY LTD, Petah Tikva (IL)

(72) Inventor: Gal Rotem, Petah Tikva (IL)

( * ) Notice: Subject to any disclaimer, the term of this patent is extended or adjusted under 35 U.S.C. 154(b) by 159 days.

(21) Appl. No.: 17/798,103

(22) PCT Filed: Feb. 15, 2021

(86) PCT No.: PCT/IL2021/050175
§ 371 (c)(1),
(2) Date: Aug. 8, 2022

(87) PCT Pub. No.: WO2021/165956
PCT Pub. Date: Aug. 26, 2021

(65) Prior Publication Data
US 2024/0004018 A1    Jan. 4, 2024

(30) Foreign Application Priority Data
Feb. 18, 2020    (GB) .................................. 2002177.0

(51) Int. Cl.
*G01S 3/48*    (2006.01)
(52) U.S. Cl.
CPC ...................................... *G01S 3/48* (2013.01)
(58) Field of Classification Search
CPC .......... G01S 17/74; G01S 17/10; G01S 17/86; G01S 7/484; G01S 13/78; G01S 13/765; G01S 13/88; G01S 19/42; G01S 13/10; G01S 3/30; G01S 13/865; G01S 5/0027; G01S 13/46; G01S 19/18; G01S 3/7835; G01S 5/0247; F41A 17/08; F41A 17/063; F41A 17/066; F41A 35/00; F41A 17/54; F41A 17/22; F41A 17/44; F41A 17/46; F41A 33/02; F41A 21/48; F41A 17/06; F41G 3/2655; F41G 7/2286; F41G 3/2666; F41G 11/00; F41G 1/35; F41G 1/00; G08B 21/02; G08B 7/06
See application file for complete search history.

(56) References Cited

U.S. PATENT DOCUMENTS

| | | | |
|---|---|---|---|
| 3,701,155 A | 10/1972 | Adams | |
| 5,307,053 A * | 4/1994 | Wills ................. | G08B 21/0263 340/8.1 |
| 5,438,321 A * | 8/1995 | Bernard .................... | G01S 5/04 340/8.1 |
| 5,724,047 A | 3/1998 | Lioio et al. | |

(Continued)

FOREIGN PATENT DOCUMENTS

CN    205193270    4/2016

*Primary Examiner* — Olumide Ajibade Akonai

(57) ABSTRACT

Some embodiments of the current invention relate to finding and identifying a transmitter. In some embodiments, two antennas are separated by an offset, and/or receive a single signal. Optionally, a processor determines a direction to the transmitter of the signal. For example, the determination may be based on a phase difference between the response of the two antennas. Optionally, the device further includes an identification module that may determine an identification associated with the transmitter. For example, the system may be used to find a particular object or person and/or to differentiate between a friend and a foe.

17 Claims, 10 Drawing Sheets

(56) References Cited

U.S. PATENT DOCUMENTS

| | | | | |
|---|---|---|---|---|
| 5,966,226 A | * | 10/1999 | Gerber | F41A 33/02 |
| | | | | 398/190 |
| 6,011,514 A | | 1/2000 | Frankovich et al. | |
| 6,097,330 A | * | 8/2000 | Kiser | G01S 17/74 |
| | | | | 398/1 |
| 6,899,539 B1 | * | 5/2005 | Stallman | F41H 13/00 |
| | | | | 345/157 |
| 8,125,371 B1 | * | 2/2012 | Daniel | F41A 17/08 |
| | | | | 342/52 |
| 8,362,945 B2 | * | 1/2013 | Nguyen | G01S 13/887 |
| | | | | 342/90 |
| 9,829,294 B1 | * | 11/2017 | Patel | F42B 6/04 |
| 2004/0160364 A1 | | 8/2004 | Regev | |
| 2007/0205890 A1 | * | 9/2007 | Brown | G08B 1/08 |
| | | | | 340/539.23 |
| 2007/0236384 A1 | * | 10/2007 | Ivtsenkov | G01S 17/74 |
| | | | | 342/45 |
| 2007/0241913 A1 | * | 10/2007 | Langenfeld | A01M 31/00 |
| | | | | 340/573.2 |
| 2008/0154533 A1 | * | 6/2008 | Poulsen | G06F 3/038 |
| | | | | 702/127 |
| 2011/0063102 A1 | * | 3/2011 | Ivtsenkov | F41A 17/08 |
| | | | | 340/505 |
| 2013/0015977 A1 | * | 1/2013 | Scott | G01S 17/10 |
| | | | | 340/600 |
| 2013/0316738 A1 | | 11/2013 | Noonan | |
| 2018/0052216 A1 | * | 2/2018 | Vered | G01S 5/0072 |
| 2021/0389097 A1 | * | 12/2021 | Sitrick | F41G 3/08 |

* cited by examiner

REMOTE RADIO DIRECTION FINDER AND IDENTIFIER

RELATED APPLICATIONS

This application claims the benefit of priority of British Patent Application No. 2002177.0 filed 18 Feb. 2020, the contents of which are incorporated herein by reference in their entirety.

FIELD AND BACKGROUND OF THE INVENTION

The present invention, in some embodiments thereof, relates to a determining a direction to an object and, more particularly, but not exclusively, to a device to determine a director to a radio transmitter.

U.S. Pat. No. 3,701,155 appears to disclose, "A first radio frequency (RF) intermediate frequency (IF) section is coupled to a sense antenna which receives an RF signal to which direction is to be determined. The IF output signal of this first section is used to phase lock a reference oscillator to this IF output signal. The reference oscillator operates at a frequency eight times the IF frequency to prevent spurious signals from appearing in the circuitry. A digital divide-by eight frequency divider provides a first reference signal for phase locking the oscillator, a gate signal and a second reference signal which, together with the IF output of the first section, provides a visual indication of phase lock. A goniometer including a rotor and a pair of orthogonally disposed loop antennas also receive the RF signal for application to a second RF/IF section. The IF output signal of the second section is gated by the gate signal into an integrating amplifier. The output signal of the integrating amplifier is detected by a zero crossing detector whose output signal is applied to a squaring circuit and also a monostable multivibrator whose output signal drives a variable frequency (rate) pulse generator. The output signal of squaring circuit and the output signal of the pulse generator are operated on by logic circuitry whose output signal controls a stepper motor. The stepper motor mechanically adjusts the rotor of the goniometer to produce a null in the IF output signal of the second section. The rotor also moves a pointer to indicate relative bearing with respect to the bow. A gyro compass repeater may move a calibrated card or ring to display the true bearing of the signal."

U.S. Patent Publication no. 20040160364 appears to disclose, "A system for finding the instantaneous spatial azimuth and elevation of a source of radio signals employing phase digitizers to measure the phase of arrival of a radio signal on an array of antennas. The phase digitizers providing digital indication of the phase of arrival, enable the determination of the azimuth, and elevation of a source of radio signal, utilizing simple digital subtraction methods."

A hybrid amplitude/phase comparison direction finding system for aircraft, employing a unique calibration system to compensate for tolerance variations in the antennas. The calibration system utilizes a programmable read only memory (PROM) for each antenna pair, wherein calibration data from pre-measured antenna patterns of the associated/ antennas are stored. The calibration data preferably includes measured relative amplitude (electromagnetic field strength) and phase data, as a function of frequency and angle from a common reference plane, for the associated antenna pair. This calibration data is stored in a PROM which is preferably disposed within an assembly which includes the antenna pair. A system processor can then retrieve the calibration data during system operation, whereupon angle of arrival measurements can be performed with improved accuracy."

U.S. Pat. No. 6,011,514 appears to disclose. "The extraction of phase information for radio frequency (RF) direction of rival is attained by pre-detect sensing and quantization of differential phase of a RF wave impinging on two or more antenna apertures, based on sensing and encoding differential phase without the use of conventional detection, and quantizing phase at or near the leading edge of a pulse signal. This is accomplished by detection of an intermediate frequency (IF) carrier, and encoding leading-edge phase (for each channel) in terms of near-phase-difference between two reference-oscillator readings containing the differential phase information—encoded as differential reference-oscillator phase. Precision angle-of-arrival is then derived from the measured differential reference-oscillator phase."

U.S. Pat. No. 5,724,047 appears to disclose, "A precision direction finding system for making precision angle of arrival estimates for a signal received through two antenna elements separated in space. Phase interferometry is used to determine a precise angle of arrival, with multiple ambiguities due to the periodic nature of the phase difference related to geometric angle. The interferometric ambiguities are resolved using the time difference of arrival (TDOA) of the signal at the two antenna elements. TDOA is measured using leading edge envelope detection for simple pulsed signals, and predetection correlation for phase and frequency modulated signals."

SUMMARY OF THE INVENTION

According to an aspect of some embodiments of the invention, there is provided a direction finding system including: a direction finder configured to determine the direction to a transmitter based on a signal transmitted by the transmitter; an identifier configured for identifying the transmitter based on the signal; an output interface configured to indicate to a user when the direction finder is point toward a selected target.

According to some embodiments of the invention, the direction finder includes: a first antenna separated by an offset vector from a second antenna; a phase detector configured to determine a difference in phase between the signal as received by the first antenna and the signal as received by the second antenna; and a processor configured to determine a difference between a direction of the offset vector and a direction to the transmitter.

According to some embodiments of the invention, the direction finding system further includes: a database of signals and associated sources and wherein the identifier compares a the signal with signals in the database for identifying a source.

According to some embodiments of the invention, the direction finding system further includes: a time buffer for adjusting a phase of a received signal.

According to some embodiments of the invention, the direction finding system further includes: a remote control transmitter configured send an activation signal to the transmitter thereby activating the transmitter in response to receiving the activation signal.

According to some embodiments of the invention, the direction finding system further includes: a temporal memory configured to store data about a detected signal for further analysis.

According to an aspect of some embodiments of the invention, there is provided a method for marking a point of interest including: positioning a transmitter near the point of interest; identifying the transmitter and a direction towards the transmitter.

According to some embodiments of the invention, the method further includes: positioning a second transmitter near a second point of interest and differentiating between signals from the transmitter and the second transmitter.

According to some embodiments of the invention, the method further includes indicating of a direction to each of the point of interest and the second point of interest.

According to some embodiments of the invention, the method further includes: selecting a selected point from the point of interest and a second point of interest on the input interface; indicating when the direction finder is pointed at the selected point.

According to an aspect of some embodiments of the invention, there is provided a system for preventing friendly fire casualties including: a transmitter associated with a friendly target; a direction finder mounted on a weapon the direction finder configured to determine a direction to the transmitter; and an indicator configured to warn a user when the direction finder is directed toward the transmitter.

According to some embodiments of the invention, the system further includes a calibrator, for adjusting a direction indicated by the direction finder to correspond to the weapon.

According to some embodiments of the invention, the direction finder includes: a first antenna separated by an offset vector from a second antenna; a phase detector configured to determine a difference in phase between a signal transmitted by the transmitter as received by the first antenna and the signal as received by the second antenna; and a processor configured to determine a difference between a direction of the offset vector and a direction to the transmitter.

According to some embodiments of the invention, the system further includes a database of signals and associated sources and wherein a processor compares a the signal with signals in the database for identifying a source.

According to some embodiments of the invention, the transmitter includes an activation interface configured to prevent activation by an unauthorized party.

According to some embodiments of the invention, the activation interface includes a biometric detector.

According to some embodiments of the invention, the system further includes a remote control transmitter associated with the direction finder and where the transmitter includes a receiver configured to receiver an activation signal from the remote control transmitter and activate the transmitter in response to receiving the activation signal.

According to some embodiments of the invention, the direction finding system further includes: a temporal memory configured to store data about a detected signal for further analysis.

According to an aspect of some embodiments of the invention, there is provided a system for protecting a plurality of first responders including: a respective transmitter for each of the plurality of first responders; a direction finding system configured to identify each respective transmitter and indicate a direction to each respective transmitter.

According to some embodiments of the invention, the direction finding system includes: a first antenna separated by an offset vector from a second antenna; a phase detector configured to determine a difference in phase between a signal transmitted by the respective transmitter as received by the first antenna and the signal as received by the second antenna; and a processor configured to determine a difference between a direction of the offset vector and a direction to the transmitter.

According to some embodiments of the invention, the system further includes a database of signals and associated sources and wherein a processor compare a the signal with signals in the database for identifying a source.

According to some embodiments of the invention, the device further including a remote control transmitter configured send an activation signal to the transmitter thereby activating the transmitter in response to receiving the activation signal.

According to an aspect of some embodiments of the invention, there is provided a method for preventing friendly fire casualties including: positioning a transmitter on a friendly object; identifying the transmitter and a direction towards the transmitter.

According to some embodiments of the invention, the friendly object includes at least one of a friendly soldier, a friendly weapon, an emergency responder and a piece of emerequipment.

According to some embodiments of the invention, the method further includes: positioning a second transmitter on a second friendly object and differentiating between signals from the transmitter and the second transmitter.

According to some embodiments of the invention, the method further includes indicating of a direction to each of the first friendly object and the second friendly object.

According to some embodiments of the invention, the method further includes recording data about a signal for further analysis.

According to some embodiments of the invention, to27, further includes indicating a direction to a transmitter of an unknown signal.

According to some embodiments of the invention, the method further includes recording data about the unknown signal for further analysis.

According to some embodiments of the invention, the method further includes recording data about an unknown signal for further analysis. Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable mediums) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) and/or a mesh network (meshnet, emesh) and/or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g., the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and POP, which are well known in the industry.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1A:
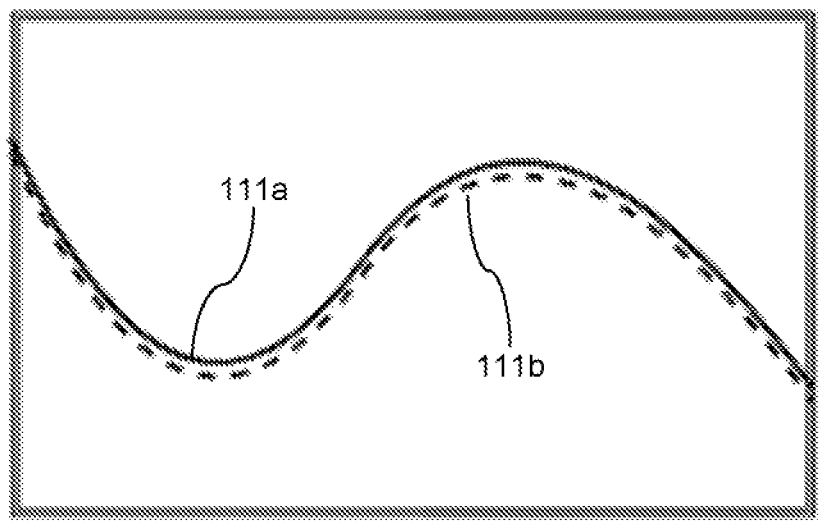
FIG. 1A illustrates a received signal by an antenna array directed at a transmitter in accordance with an embodiment of the current invention.

The present invention, in some embodiments thereof, relates to a determining a direction to an object and, more particularly, but not exclusively, to a device to determine a director to a radio transmitter.

Overview

An aspect of some embodiments of the current invention relates to finding and/or identifying a transmitter. In some embodiments, two antennas are separated by an offset, and/or receive a single signal. Optionally, a processor determines a direction to the transmitter of the signal. For example, the determination may be based on a phase difference between the response of the two antennas. Optionally, the device further includes an identification module that may determine an identification associated with the transmitter. For example, the system may be used to find a particular object or person and/or to differentiate between a friend and a foe.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1B:
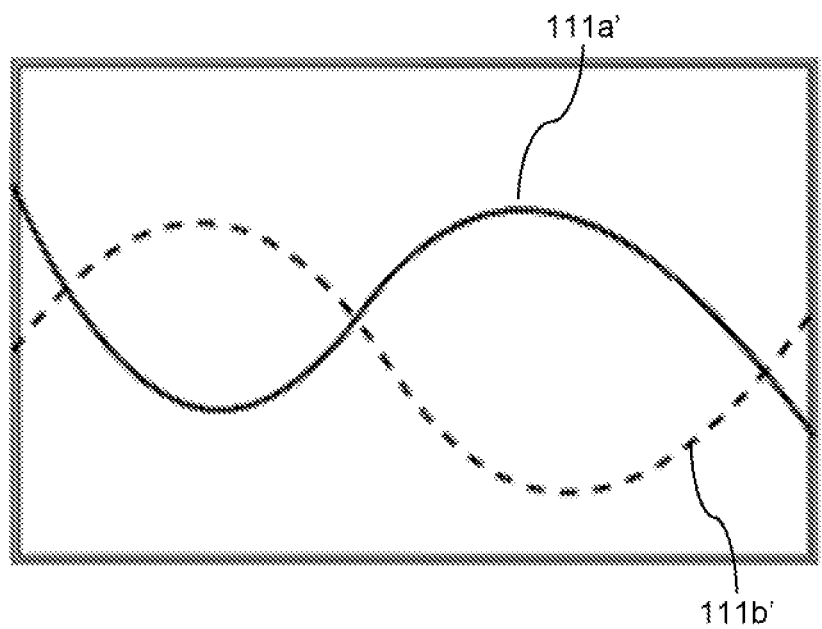
FIG. 1B illustrates a received signal by an antenna array directed substantially perpendicular to a transmitter in accordance with an embodiment of the current invention.

FIG. 1A illustrates a received signal by an antenna array directed at a transmitter in accordance with an embodiment of the current invention. FIG. 1B illustrates a received signal by the antenna array directed substantially perpendicular to the transmitter in accordance with an embodiment of the current invention. In some embodiments, a direction finding system my use a Time Difference of Arrival TDoA methodology to determine the direction to an object transmitting a radio signal. In some embodiments, a method of direction finding without may not require moving parts and/or a motor.

In some embodiments, the difference between phase between a signal detected at two antennas may be used to determine the relationship between the axis between the antennas and the direction to the transmitter. For example, when two antennas are distanced by an integral of the wave length and/or half the wavelength of the signal being measured and the axis between the antennas is aligned with the direction to the transmitter, the signals picked up by the two antennas may be in phase (for example as illustrated in FIG. 1A). For example, when two antennas are distanced by an integral of the wave length of the signal being measured and the axis between the antennas is aligned perpendicular to the direction to the transmitter, the signals picked up by the two antennas may be in opposite phase (for example as illustrated in FIG. 1B).

Figure 2:
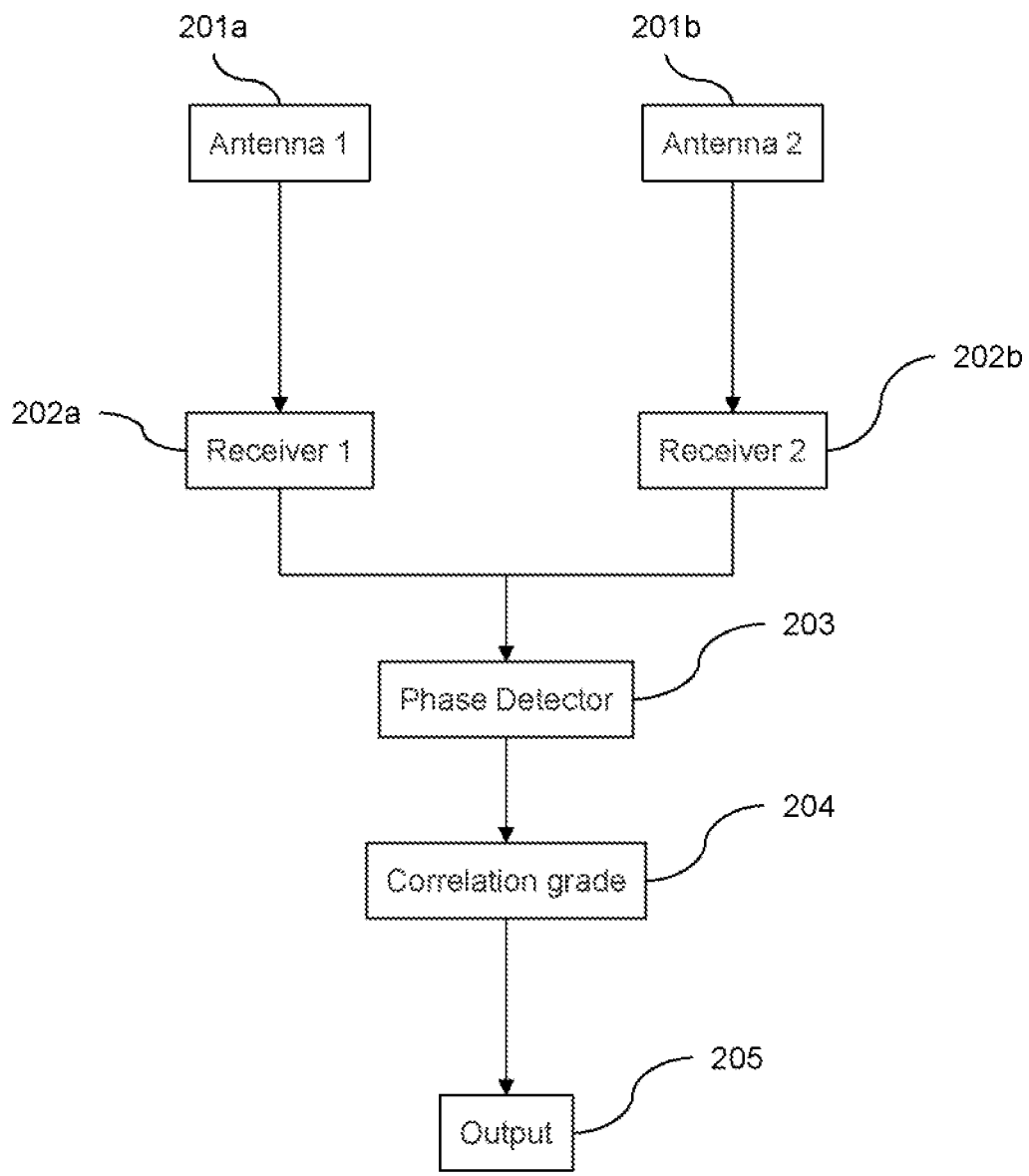
FIG. 2 is a block diagram of a TDoA signal processor in accordance with an embodiment of the current invention.

FIG. 2 is a block diagram of a TDoA signal processor in accordance with an embodiment of the current invention. In some embodiments, there may be a first antenna 201a and a second antenna 201b offset from the first antenna 201a. Each antenna 201a, 201b is optionally connected to a respective receiver 202a, 202b. Optionally, antennas 201a, 201b and receivers 202a, 202b are tuned so that receivers 202a and 202b receive the same signal at a phase offset is dependent on the relationship between the offset between the antennas 201a, 201b and the position of the transmitter of the signal. Receivers 202a, 202b output a processed signal to a phase detector 203. For example, phase detector 203 may determine the phase of the signal received by each antenna 201a, 201b and output that information to correlation grader 204. The correlation grader 204 optionally, analyzes the phase offset between the two signals and outputs an indication 205. For example, the indication may include an indication 205 whether the offset between the two antennas 201a, 201b is aligned with the direction to the transmitter of the signal. In some embodiments, the distance between antennas 201a, 201b may range for example, between 0.1 to 0.5 cm and/or between 0.5 to 1 cm and/or between 1 to 3 cm and/or between 3 to 10 an and/or between 10 to 40 cm. In some embodiments, the device is configured to find a direction to a signal at a frequency of between 10 to 100 kHz and/or between 0.1 to 1 MHz and/or between 1 to 3 MHz and/or between 3 to 8 MHz and/or between 8 to 20 MHz and/or between 20 to 100 MHz.

Figure 3:
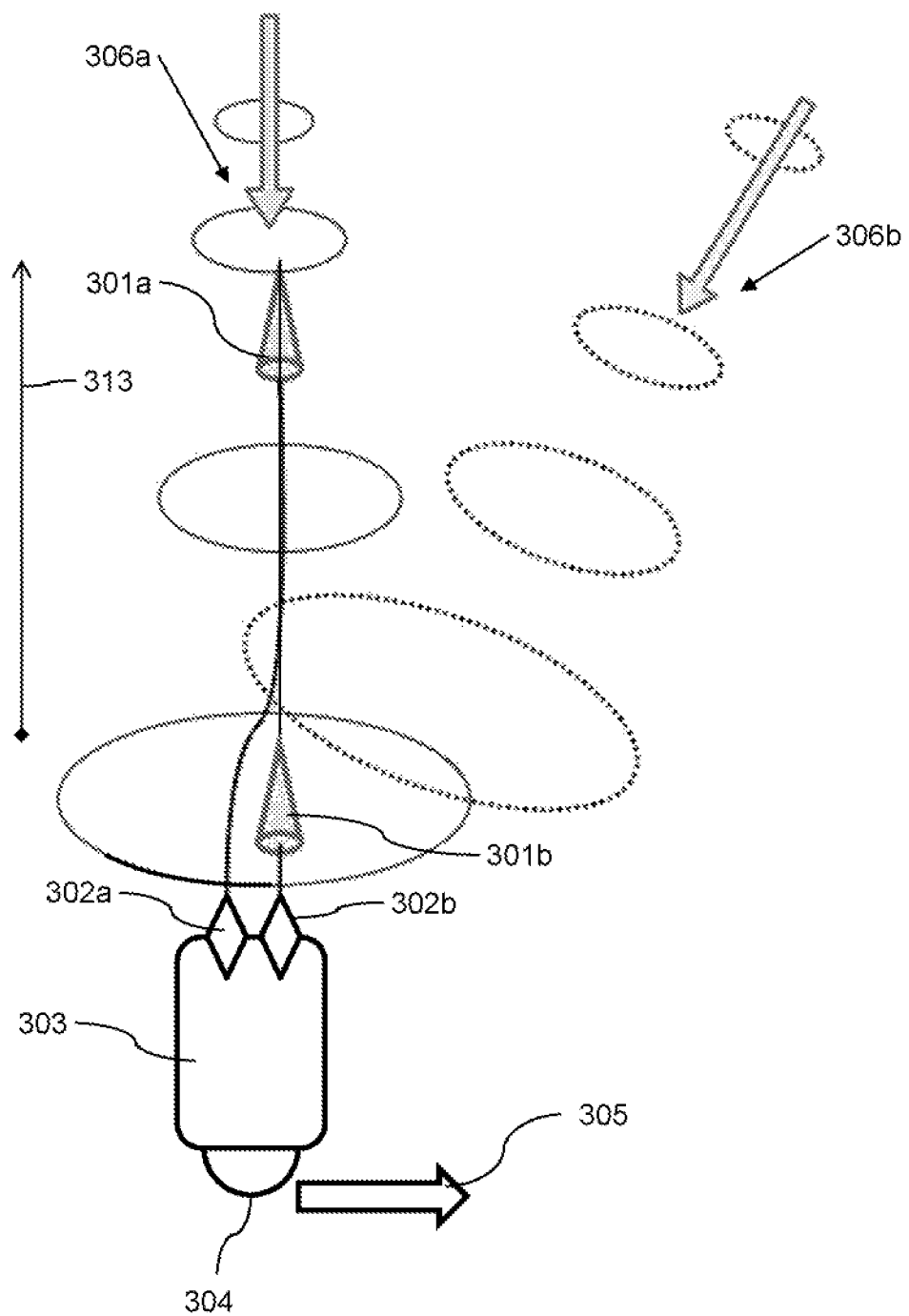
FIG. 3 is a schematic diagram of a TDoA signal processor in accordance with an embodiment of the current invention.

FIG. 3 is a schematic diagram of a signal processor in accordance with an embodiment of the current invention. For example, the processor may use TDoA to determine an angle to a transmitter. In some embodiments, there may be a first antenna 301a and a second antenna 301b offset from the first antenna 301a by an offset vector 313. Each antenna 201a. 201b is optionally connected to a respective receiver 302a, 302b. Optionally, antennas 301a, 301b and receivers 302a, 302b are tuned so that receivers 302a and 302b receive the same signal at a phase offset which is dependent on the relationship between the offset vector 313 between the antennas 301a, 301b and the position of the transmitter of the signal. Receivers 302a, 302b output a processed signal to a phase detector 303. For example, phase detector 303 may determine the phase of the signal received by each antenna 301a, 301b and output that information to correlation grader 304. The correlation grader 304 optionally, analyzes the phase offset between the two signals and outputs an indication 305.

In some embodiments, the indication may include an indication 305 whether the offset between the two antennas 301a, 301b is aligned with the direction to the transmitter of the signal. For example, when the device is pointed at a transmitter, a signal 306a may be aligned with the offset 313. For example, when the device is not pointing directly at the transmitter, the signal 306b may be non-aligned with the offset 313.

Figure 4:
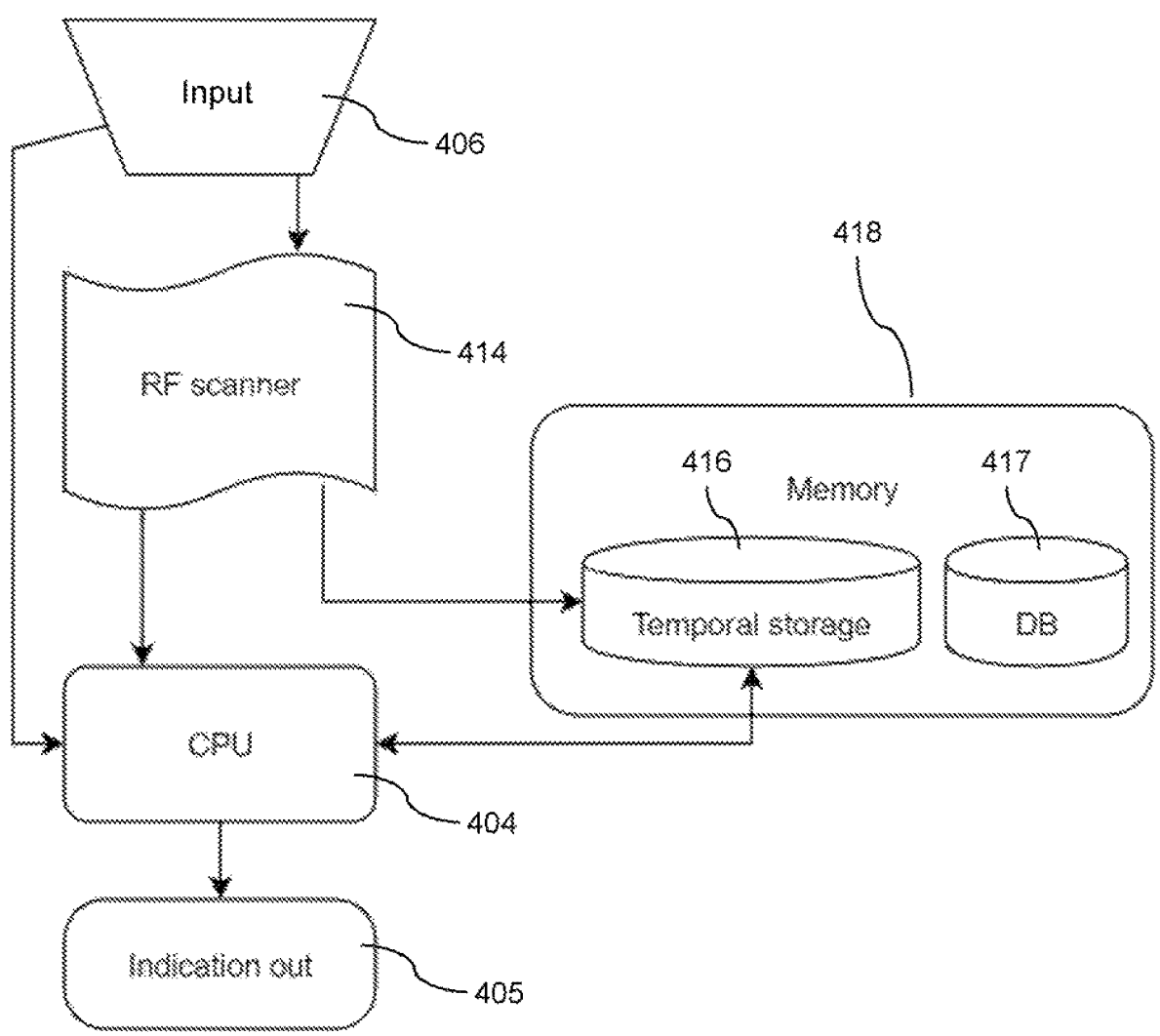
FIG. 4 is a block diagram of a system for analyzing a signal in accordance with an embodiment of the current invention

In some embodiments, phase detector 303 and/or correlation grader 304 may include a data processor (for example as illustrated in FIG. 4). Optionally, the data processer is further configured to process complex signals.

In some embodiments, utilize a radio frequency (RF) transmitter and receiver located at opposite ends of a radio communication path, with a continuously rotating directional antenna located at either the transmitting or receiving end of the path, and an omni-directional antenna located at the other end. For example, a reference signal is provided at the receiving end of the path to identify a particular point (such as North) in the cycle of the rotating antenna. The rotating antenna, optionally, causes a periodic modulation of the RF signal (AM, or FM, or a combination of both). In some embodiments, this modulation may be detected by the receiver. For example, the demodulated output signal provided by the receiver may be periodic at the rotational frequency of the rotating antenna, with the phase of that output signal relative to that of the reference signal being a measure of the relative bearing of the receiver and transmitter locations. Optionally, the rotating antenna may be physically rotated (as by a motor). Alternatively or additionally, with a multiple element configuration, the elements may remain fixed with the pattern rotated by an electronic modulating arrangement.

FIG. 4 is a block diagram of a system for analyzing a signal in accordance with an embodiment of the current invention. For example, a processor CPU 404 may be included in a correlation grader (e.g., 204, 304). In some embodiments, the system will include an RF scanner 414. For example, scanner 414 selects frequency to analyze and/or for tuning an antenna (e.g., 201a, 201b, 301a, 301b) and/or receiver (e.g., 202a, 202b, 302a, 302b). The CPU 404 optionally performs analysis of the signals in order to find new patterns and write them into memory 418. For example, data may be stored in a temporal storage 416 and/or in a database 417. In addition, the CPU 404 find correlation with existing digital signatures in the database 417. For example, after finding a certain phase behavior and/or signature, the system may send an indication 405 out. The indication 405 might include color, icon, or sound. For example, the digital signature may indicate an identity of a transmitter. Various indications 405 may tell a user if the transmitter is a friend or foe, is transmitting a distress signal, belongs to the user and/or someone else.

In some embodiments, a number of known signal signatures may be stored in database 417. Optionally, when a signal is recognized the CPU 404 tests if the signal corresponds to one of the signatures stored in the database 17 and/or identifies the transmitter. In some embodiments, when a signal does not match a known signal, CPU 404 stores information about the signal (for example, in temporal storage 416). Additionally or alternatively, the device may store further information such as a current position, identified known signals, positions of various signals. Optionally, data about unknown signals is analyzed either in real time and/or in post processing. For example, which a soldier is in a battle, the device may record signals of both friendly and enemy transmissions. In some embodiments, the recorded data may be very useful in reconstructing the battle and/or learning to recognize enemy units and/or to recognize enemy signals in future actions. Alternatively or additionally, the data may help understand whether friendly transmissions were really necessary and/or to recognized signals that were fakes.

In some embodiments, CPU 404 is further configured to process complex signals. For example, the CPU 404 may be used to recognize information about a transmitter. For example, a transmitter may signal an identity of an owner and/or the signal of the transmitter may have a special form that identifies particular people and/or a group of people. Optionally, the indicator 405 may indicate information about the transmitter. Optionally, CPU 404 will be configured to determine the direction to a transmitter of a wavelength that is not entuned to the offset between the antennas. For example, from interference patterns, the processor may determine the direction to a transmitter of an arbitrary wavelength. Additionally or alternatively, the CPU 404 may be configured to differentiate between multiple signals coming at different angles and/or between a signal and noise (for example a multipath signal). Optionally, the system may scan, store and track new and/or different types of signals. For example, the system may find and/or recognize patterns. For example, the system may employ scanner 414 and/or "machine learning" processes on CPU 404 and/or data and/or programs stored on memory 418. In some embodiments the device may be used to find a direction to particular object, for example, a car in a parking lot. For example, the device will ignore other signals and will give an indicator of direction to the specific transmitter being sought.

In some embodiments, an output indicator 405 may be sent in response to a specific situation. For example, a direction finder may be placed on a gun sight. A warning indicator 405 may be activated when the weapon is pointed at a friendly soldier (e.g., a soldier wearing an active transmitting unit of my army/team).

In some embodiments, a system may be used to find valuable objects. For example, a person may put a transmitter on his child and/or pet. Optionally, before taking the child to a crowded and/or complex area (a large playground, a shopping center, a movie theater, an amusement park), the parent puts the transmitter on the child and activates it. Then when the parent is looking for the child, he just turns on the finding device and scans in various directions until the child's device is detected and the direction to the child is indicated. Optionally, the direction finding device may be coupled with a distance detecting device. In some embodiments a locator device may facilitate determining the location of the transmitter relative to the locator. For example, the locator device may be used for calculating the direction as well as the range from the phase information received by multiple antennas in the locator. For example, a warning may be sent to the parent when the child has wandered too far away and/or the direction finding device will also tell the parent in which direction to seek the child. Alternatively or additionally, a transmitter may be put on a car, for example making it easy to find in a parking lot. Alternatively or additionally, the finding device may detect transmissions for a device that transmits a signal on its own. For example, the finding device may a paired to a cell phone (for example, the finding device may be programmed to find the code of the specific phone alternatively or additionally an application may be installed on the cell phone that sends an identification signal that the finding device recognizes).

Some application for which a direction finder in accordance with some embodiments of the current invention is used may be used include:

Object Finding: In some embodiments, a direction finder may be used to find the direction towards an object carrying the transmitter, for example, a car in a parking lot. For example, a space where the object was left may be scanned with the direction finder. When the direction finder points to the direction of the object (e.g., the car) the localizer provides the user with feedback [e.g., visible feedback (e.g., light), soundable feedback (e.g., a tone) and/or haptic feedback (e.g., a vibration)].

People Finding: In some embodiments, a direction finder may be used to find the direction towards a person carrying the transmitter. For example, a transmitter may be placed on a child in a shopping mall. The direction finding device may be used to scan the space with the until it points to the direction in which the child is found at which time the localizer optionally provides the user with feedback.

Point of Interest Direction: In some embodiments, a direction finder may be used in fairs, museums, guided tours, and similar venues to find the direction towards a point of interest. For example, a transmitter with a unique signature is installed by points of interest. A user may optionally input to the direction finding device the point of interest for which he is searching. Then the device is, optionally, used to scan the space to identify, that signature until it points to the direction the point of interest at which time the user may be provided feedback. For example, multiple transmitters, each with an individually recognizable signal may be placed on different points of interest. A user optionally inputs to a user interface of the direction finding device the point that he wishes to see and/or the direction finding device directs him to the point. Alternatively or additionally, when the direction finding device is pointed toward a point of interest, an output interface of the direction finding device may identify to the user point and/or give information about the point. For example, in a museum the direction finding device may give a description and/or information about an exhibit when it is pointed towards the exhibit (e.g., even from distance and/or from another room).

Localize in Emergency: In some embodiments, a Fire Fighter, an Emergency Response worker, a Rescue worker, a Miner, a Cave Explorer etc. will wear a transmitter. Optionally, the transmitter may have a unique identifier. In some embodiments, a direction finder may be used to find the wearer. The system may find a person even in total darkness and/or when covered by fire and/or smoke and/or in a collapsed building.

In some embodiments, a direction finding device in accordance may be included on a robot. For example, the device may be used by the robot to find and/or identify objects marked by a transmitter.

In some embodiments, the finding device may include a remote control transmitter. For example, the remote control transmitter may be used to remotely activate a transmitter that the device is seeking.

Figure 5:
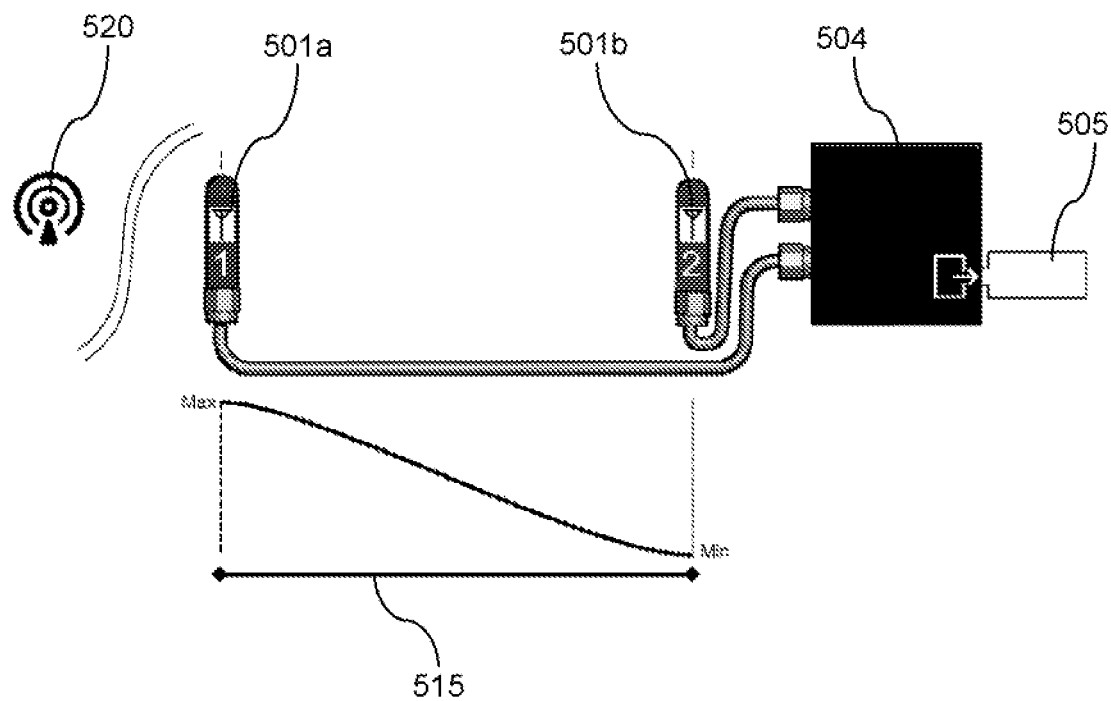
FIG. 5 is a schematic illustration of a fixed wave length direction finding device in accordance with an embodiment of the current invention.

FIG. 5 is a schematic illustration of a direction finding device in accordance with an embodiment of the current invention. In some embodiments, a device includes two antennas 501a, 501b at a fixed distance. For example, the antennas may preferentially be situated at a distance of a half a wave length 515. For example, for a 5 GHz signal the half wavelength 515 may be around 3 cm. Optionally a processor 504 receives the signals from the two antennas and calculates an angular difference in orientation between the vector separated the antennas and the direction to the broadcasting transmitter 520. In some embodiments, the processor 504 outputs an indicator 505 of the angular difference. Optionally, processor 504 is further programmed to identify objects and/or transmitters and/or to output a signal indicating to a user towards whom the device is pointing.

Figure 6:
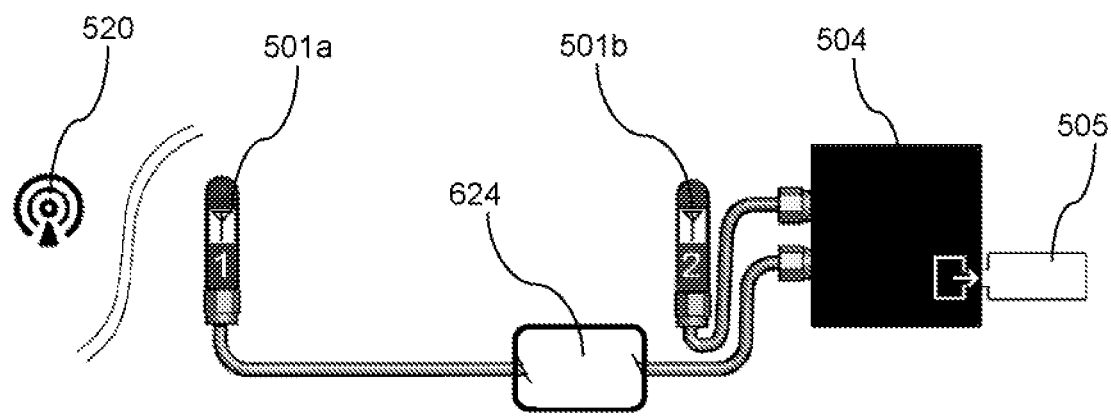
FIG. 6 is a schematic illustration of a variable wave length direction finding device in accordance with an embodiment of the current invention.

FIG. 6 is a schematic illustration of a variable wave length direction finding device in accordance with an embodiment of the current invention. In some embodiments, a time buffer creates a delay in transfer of a signal between one of the antennas 501a, 501b and the processor 504 and/or a virtual time buffer may be programmed into the processor. The length of the delay can be adjusted to simulate a larger distance between the antennas and/or facilitate the device detecting direction towards a transmitter 520 at a different wavelength. Alternatively or additionally, the processor 504 may be programmed to interpret phase difference between waves arriving at different antennas 501a, 501b to determine the angle to a transmitter 520 in accordance to the distance between the antennas and for signals of different the wave lengths and/or wave forms.

Figure 7B:
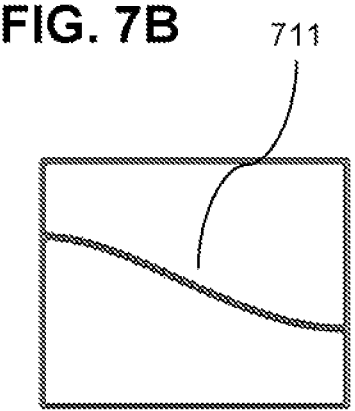
FIG. 7B illustrates response of two antennas to a tuned signal from a source aligned to the vector between the antennas.
Figure 7A:
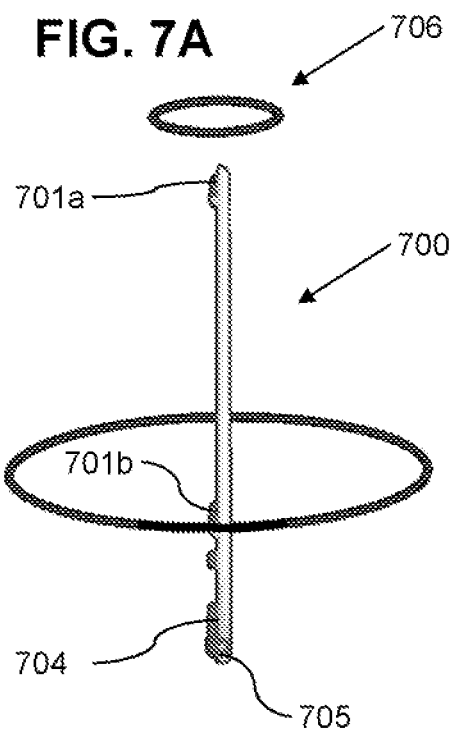
FIG. 7A is a schematic illustration of a direction finding device aligned with a signal in accordance with an embodiment of the current invention.

FIG. 7A is a schematic illustration of a direction finding device 700 aligned with a signal 706 in accordance with an embodiment of the current invention. For example, a transmitter may be positioned on the line passing through two antennas 701a, 701b of the device. Optionally, the distance between the antennas is 0.5 wavelengths of the received signal such that the when the transmitter is aligned with the line between the antennas, the signals received at the two antennas are in tune and a single harmonic signal 711 (as illustrated for example in FIG. 78) is received from both antennas at a processor 704. Optionally, an indicator 750 is activated to inform a user that he is aiming at the transmitter and/or to indicate an identity of the transmitter and/or to indicate a direction to the transmitter.

Figure 8B:
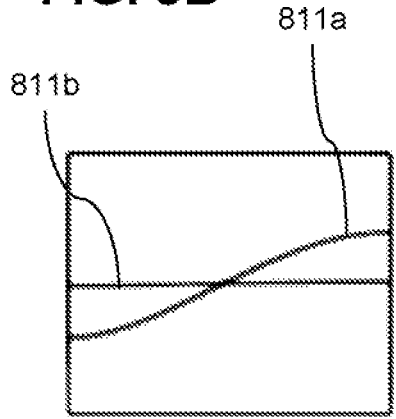
FIG. 8B illustrates response of two antennas to a tuned signal from a source that is not aligned to the vector between the antennas.
Figure 8A:
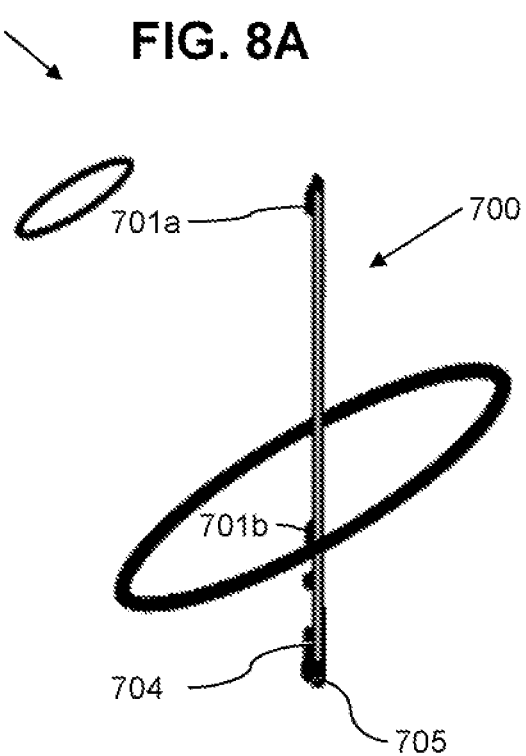
FIG. 8A is a schematic illustration of a direction finding device that is not aligned with a signal in accordance with an embodiment of the current invention.

FIG. 8A is a schematic illustration of a direction finding device 700 that is not aligned with a signal 806 in accordance with an embodiment of the current invention. For example, a transmitter may be positioned away from the line passing through two antennas 701*a*, 701*b* of the device. Optionally, the distance between the antennas is 0.5 wavelengths of the received signal such that the when the transmitter is not aligned with the line between the antennas, the signals received at the two antennas are in not tune and complex signals 811*a*, 811*b* (as illustrated for example in FIG. 8B) are received from both antennas at a processor 704. Optionally, an indicator 750 is activated to inform a user that he is not aiming at the transmitter and/or to inform him what is the angle to the transmitter.

Figure 9:
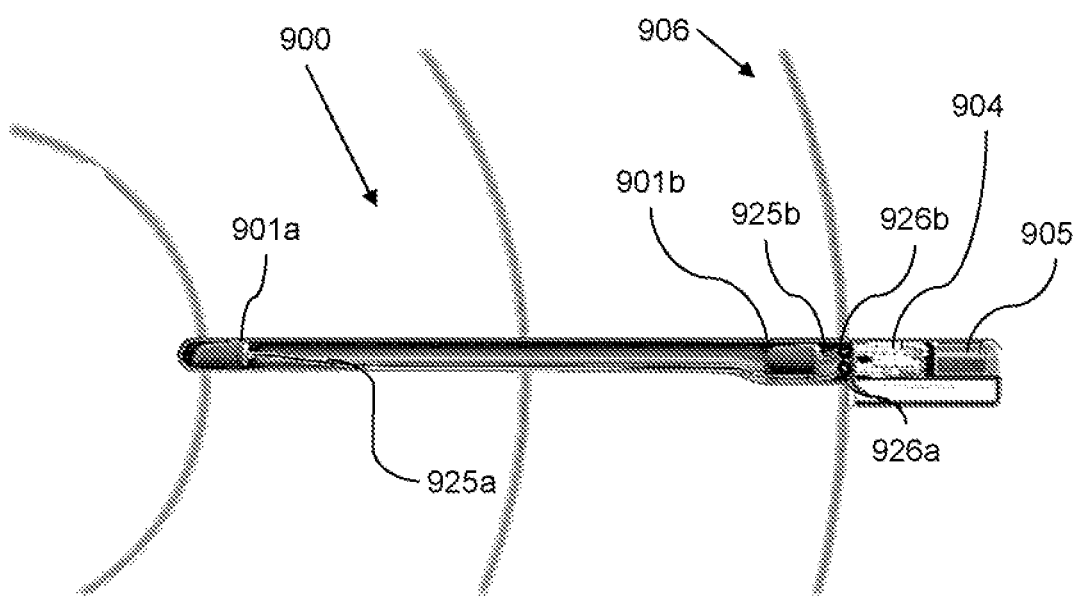
FIG. 9 is a schematic illustration of a direction finding device in accordance with an embodiment of the current invention.

FIG. 9 is a schematic illustration of a direction finding device 900 in accordance with an embodiment of the current invention. For example, device 900 includes two antennas 901*a*, 901*b*. Optionally, a signal 906 is sent by a transmitter and received by antennas 901*a*, 901*b*. In some embodiments, the signal 906 in picked up by antennas 901*a*, 901*b* and produces a response 926*a*. 926*b* respectively carried by a wire 925*a*, 925*b* respectively to a processor 904. For example, the antennas 901*a*. 901*b* are tuned so that an signal 906 from a receiver positioned along the line that connects the antennas 901*a*, 901*b* will produce tuned responses 926*a*, 926*b*. Optionally, processor 904 in configured to determine an angle to a source of signal 906 based on the phase relationship of responses 926*a*, 926*b*. Alternatively or additionally, processor 904 is configured to determine a source a signal 906 (for example based on the signal 906 itself and/or an associated header or another means. Alternatively or additionally, processor 904 may be configured to determine the direction to various signal forms and/or frequencies. In accordance with the determined direction and/or identified source of the signal 906, processor 904 may output an indicator 905. For example, the indicator 905 may indicate if the device is pointed at a friend or foe (e.g., with a colored indicator). Alternatively or additionally, processor 904 may identify multiple objects in multiple directions and report to the user (for example on a view screen) the positions and/or identities. Alternatively or additionally, the direction finding device may selectively identify, locate and/or ignore certain objects. In some embodiments, a processor is configured to calibrate the relationship between the direction, the identification and the indicator 905. For example, when direction device 900 is used as a sight for a gun, processor 904 may be calibrated to respond to alignment with the direction in which the gun is pointed (e.g., rather than the direction of the pointing device which may not be perfectly aligned with the gun). In some embodiments, the device 900 may facilitate locating and/or identifying a transmitter even behind objects such as walls and/or curtains.

Figure 10:
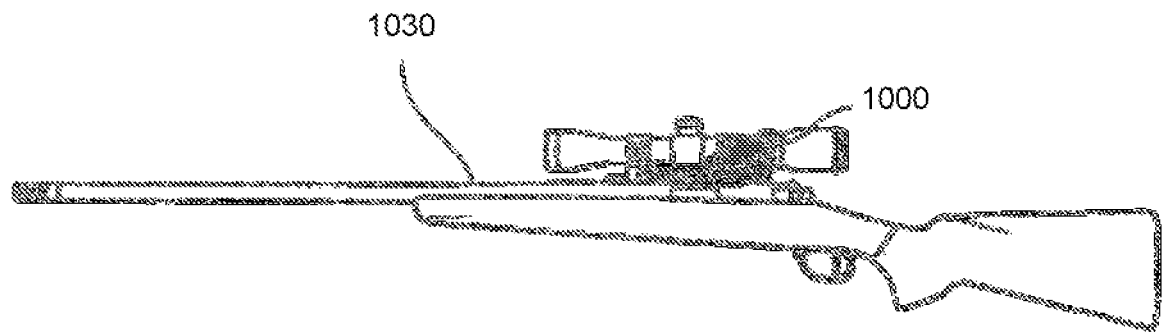
FIG. 10 is a schematic illustration of a direction finding device attached to a weapon in accordance with an embodiment of the current invention.

FIG. 10 is a schematic illustration of a direction finding device 1000 attached to a weapon 1030 in accordance with an embodiment of the current invention. For example, device 1000 may include any of the embodiments describe herein (e.g., device 900). In some embodiments, a direction finding device 1000 will inform a weapon user when the weapon 1030 when the weapon is aimed a certain target. The direction detecting device 1000 may be programed to warn a user of weapon 1030 when he is aiming at friendly target. Optionally, this may reduce injuries for friendly fire incidents.

In some embodiments, first responders and/or soldiers may wear a transmitter. Optionally, weapons 1030 supplied to the police and/or soldiers may include a direction finding device 1000, such that if they aim at a soldier of their own army and/or at a first responder, they will be warned that they may be aiming at a friendly target. Alternatively or additionally, the direction finding device may make it easier to find the wearer in case of a rescue operation. For example, the direction finder 1000 may make easier to find a first responder having a transmitter who has been trapped in a collapsing building.

In some embodiments, a transmitter and/or a direction finding device will be equipped with protection against unauthorized use. For example, the transmitter may include an identifier for verifying the identity of its user, for example by means of a password and/or bio-identification mechanism to avoid unauthorized use. For example, to activate the device may require the user identifying himself and/or periodically the device may require a user to identify himself. For example, this may prevent a criminal and/or an enemy soldier from stealing the device and using it to protect him from attack. Alternatively or additionally, the transmitter may transmit identification information. Alternatively or additionally, the transmitter may transmit a signal indicating that it is in a non-verified state. For example, the transmitter will transmit its position and/or identity and/or a warning that it is in a non-verified state. Optionally, the direction finding device includes a module that determines if there is a problem with the reported identification of the transmitter. For example, if a transmitter belongs to a soldier who is not supposed to be in the area of a battle (e.g., the transmitter may identify the soldier and/or his unit and if that unit is not involved in the current battle, then the direction finding device may not identify it as a friend).

In some embodiments, a transmitter and/or a direction finding device may include protection against misuse. In some embodiments, the system is designed to prevent an enemy from using the transmitted signal to target and/or detect a transmitter. For example, the transmitter may transmit a coded signal that cannot be picked up without knowing the code (for example, the signal may be a spread spectrum signal such as CDMA. TDMA, orthogonal hopping transmission/scrambled and/or compressed data transmission) and/or the direction finding device may be configured (e.g., the processor of the direction finding device) may be configured to detect and/or decode the signal. Alternatively or additionally, the device may be activated only at specific times. For example, an actor wearing the transmitter may only activate the transmitter when there is an expectation of a friendly fire. Alternatively or additionally, the direction detecting device 1000 and/or weapon 1030 may send a signal activating the transmitters before firing. In some embodiments, signals may include codes that change in order to prevent an enemy from using them. Alternatively or additionally, decoy device may be supplied sending fake signals and/or real signals, optionally this will prevent an enemy from knowing where are the real soldiers and/or where are the decoys even if he cracks and/or steals the codes and/or devices.

In some embodiments, an army and/or a police force may be aware of a transmitting device that is being used by a target and/or may user the direction finding device 1000 to find and/or locate and/or target an enemy. For example, the direction detection device may be used to find the direction to a cell phone being used by a criminal holding hostages in a building.

Figure 11:
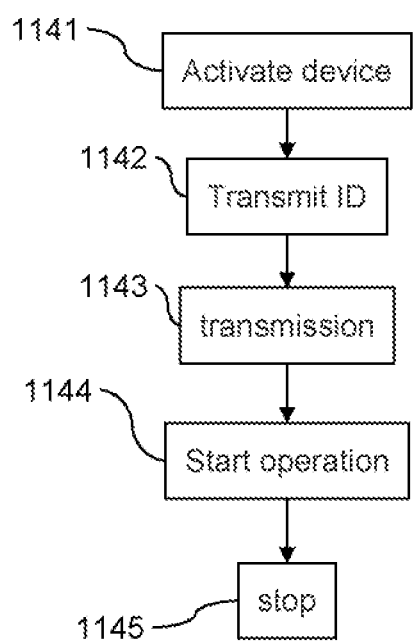
FIG. 11 is a flow chart of application of a direction finder in accordance with an embodiment of the current invention.

FIG. 11 is a flow chart of application of a direction finder in accordance with an embodiment of the current invention. In some embodiments, a user (for example a soldier) may hold (e.g., wear) a transmitter. Optionally, the user activates 1141 the transmitter. For example, a soldier may active 1141 a transmitter before beginning a maneuver where he is in danger from friendly fire (for example, before starting 1144 a maneuver wherein he moves to outflank an enemy position). In some embodiments, there may be a time delay after activation 1141 before the maneuver starts 1144 and/or there may be a time delay after the maneuver starts 1144 when the transmitter is activated 1141. In some embodiments, the transmitter will be activated 1141 in response to a remote signal. For example, a weapon that is about to fire on an enemy position may first send a warning signal that activates 1141 friendly transmitters in the area and/or a direction finding device may send an activation 1141 signal when in use. Optionally, the transmitter will transmit an identification signal 1142 and/or transmit a location signal 1143. Optionally, the transmitter may be deactivated 1145 and/or the transmitter may be deactivated 1145 automatically and/or by remote control.

Figure 12:
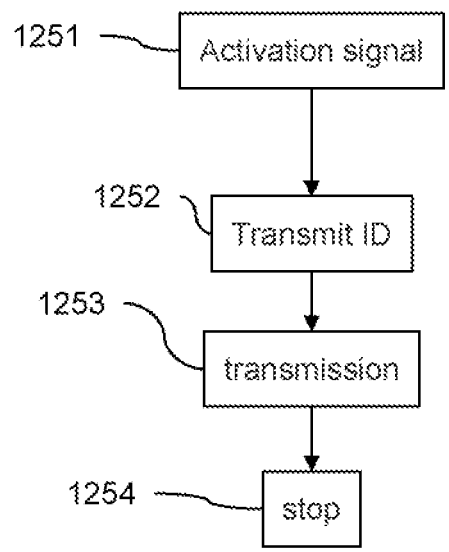
FIG. 12 is a flowchart illustration of remote activation of a transmitter in accordance with an embodiment of the current invention.

FIG. 12 is a flowchart illustration of remote activation of a transmitter in accordance with an embodiment of the current invention. In some embodiments, a transmitter may be activated remotely. For example, before firing on an enemy position and/or when searching for a missing first responder, and/or when searching for a lost object (e.g., a car in a parking lot) a finding device may transmit 1251 an activation signal. For example, the activation signal may activate a transmitter. Optionally, the activation signal may include a sign of which transmitter should activate. Alternatively or additionally, the finding device may activate a large number of transmitters and/or decide on the proper one to find. Optionally, the transmitter may transmit an ID signal 1252 and/or transmit a location signal 1253. Optionally, there may be a delay in which the transmitter waits for an acknowledgement. Optionally, after a fixed time and/or in reaction to a remote signal and/or in response to a local act, the transmitter is deactivated 1254.

Figure 13:
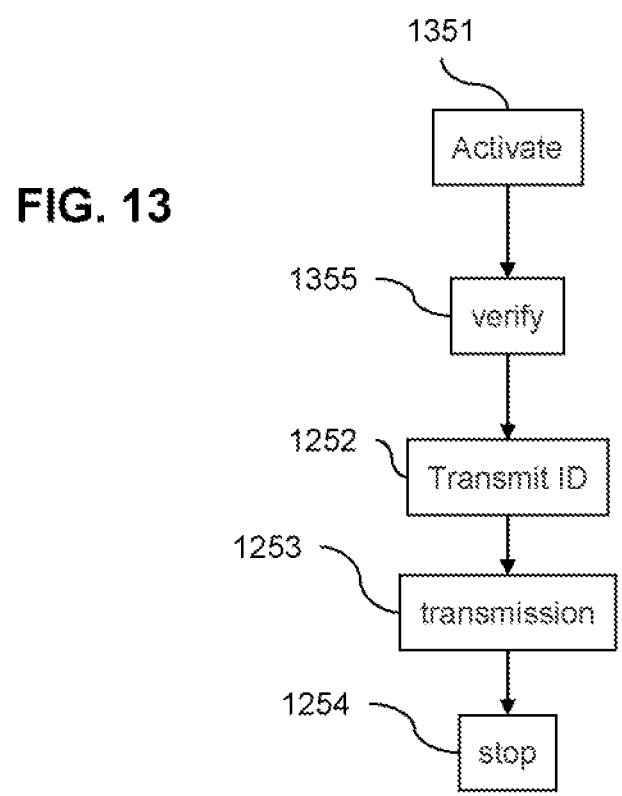
FIG. 13 is a flowchart illustration of activation of a transmitter including verification in accordance with an embodiment of the current invention.

FIG. 13 is a flowchart illustration of activation of a transmitter including verification in accordance with an embodiment of the current invention. In some embodiments, a transmitter may be activated 1351. For example, activation may be performed remotely (e.g., as described in FIG. 12 step 1251) and/or locally for example, but a user turning on the device for example as described in FIG. 11 step 1141. Optionally, before the transmitter activates, it verifies 1355 that it is being employed to the authorized user. For example, activating the device may require entering a password and/or identification by biometrics (e.g., by activating a fingerprint reader and/or a retina reader and/or voice identification and/or facial identification) and/or other means before becoming active. Alternatively or additionally, the device may periodically require verification 1355 to avoid deactivating. For example, if the device does not receive re-verification, the device may indicate to a user a warning to verify or the transmitter will stop, and/or the device may deactivate. Optionally, the active transmitter transmits and identification signal 1242 and/or a location signal 1243 until the transmitter is stopped 1254 (for example as described in step 1254 of FIG. 12). Alternatively or additionally, when the transmitter is not verified, it may transmit a warning to the direction finding device that the user has not been verified 1355.

Figure 14:
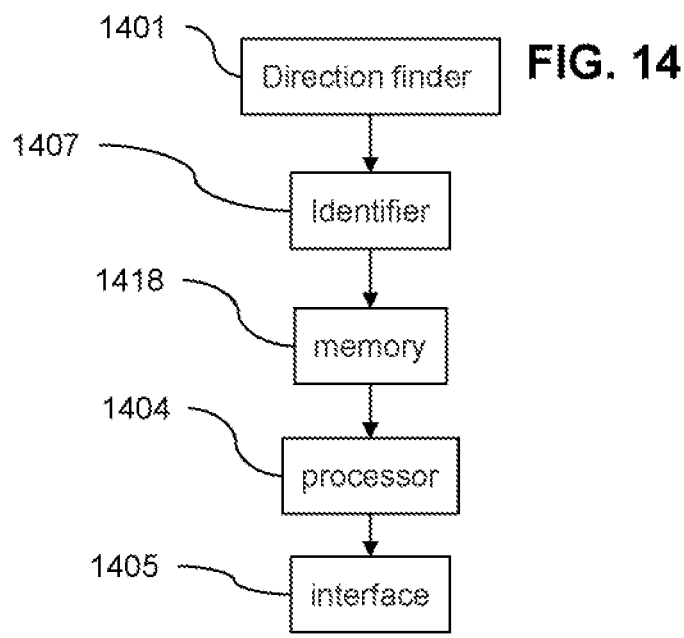
FIG. 14 is a block diagram of a direction finder system in accordance with an embodiment of the current invention.

FIG. 14 is a block diagram of a direction finder system in accordance with an embodiment of the current invention. In some embodiment, the system will include a direction finder 1401 (for example as described in any of the previous embodiments, [e.g., FIGS. 2-9]). Optionally, the system includes an identifier 1407. For example, the identifier 1407 may include a data base that associates a user and/or organization and/or device with a transmitted code and/or pattern. For example, the identifier may receive an identification code or pattern with a shared RF receiver used by the direction finder 1401. In some embodiments, the system includes a processor 1404. For example, the processor 1404 may identify, a source of signal, for example by comparing database data with received identification signals and/or the processor 1404 may determine a direction to one or more transmitters, for example as described in more detail in various embodiments described herein. Optionally, the system includes a user interface 1405. For example, the interface 1405 may include an indicator (e.g., as described in various embodiments herein) and/or an input interface (for example, a touch screen, a biometric identification device etc. for example, as described in various embodiments herein above). In some embodiments, a direction finding system may include a transmitter. Optionally, the direction finding system may transmit a signal to remotely activate one or more transmitters, for example before and/or when the direction finding unit is used. Optionally, the direction finding system may transmit a signal to remotely deactivate one or more transmitters, for example after the direction finding unit is used.

In some embodiments, a system for finding objects may include a memory 1418. For example, the memory may used for a database of know signal signatures. Optionally, the signatures may be used to recognize predetermined transmitters and/or to help a user locate a predetermined transmitter. Alternatively or additionally, the memory 1418 may be used to record data about signals for further processing. For example, position and/or timing information about predetermined transmitters may be recorded for mission debriefings. For example, after a battle and/or a fire fighting event and/or a police action, data about the location of friendly forces may be used to determine better strategies in future missions. Alternatively or additionally, an unknows signal may be recorded. For example, the data from the unknown signals may be analyzed to determine previously unknown forces and/or enemy forces and/or to find enemy transmissions that can be recognized in future missions and/or to understand previously unrecognized incidents. For example, in a fire where first responders failed to find a resident who was seriously hurt, the data may be used to find where the resident's phone was and try to figure what would have been a better strategy to find him.

Figure 15:
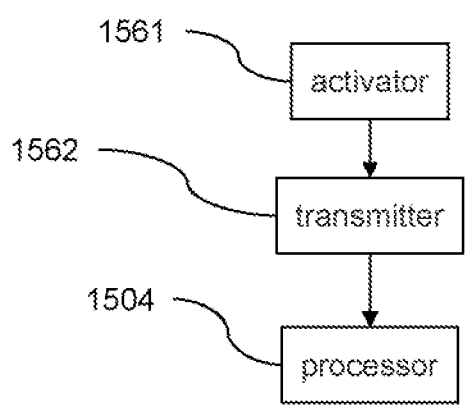
FIG. 15 is a block diagram illustrating a transmitter which may be used to mark an object to be located using a direction finding system in accordance with an embodiment of the current invention.

FIG. 15 is a block diagram illustrating a transmitter which may be used to mark an object to be located using a direction finding system in accordance with an embodiment of the current invention. In some embodiments, a transmitting device; may include an activator 1561. For example, the activator 1561 may include a user interface allowing a user to activate a transmitter 1562 and/or deactivate the transmitter 1562 and/or activate the transmitter 1562 for a time period and/or conditionally. Alternatively or additionally, the system may include a receiver, for example, the receiver may receive a remote control signal for activating the transmitter 1562. Optionally, the system includes a processor 1504. For example, the processor 1504 may control the transmitter 1562 to transmit a signal that is used to the direction finding system to locate the transmitter 1562. Alternatively or additionally, the processor 1504 may control the transmitter 1562 to transmit a signal that is used to identify the transmitter 1562.

It is expected that during the life of a patent maturing from this application many relevant technologies will be developed and the scope of the terms are intended to include all such new technologies a priori.

As used herein the term "about" refers to ±10% The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a". "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for preventing friendly fire casualties comprising:
   a transmitter with a unique identifier signal indicating a friendly object;
   a direction finder mounted on a weapon said direction finder configured receive a signal transmitted by said transmitter and to determine a direction to said transmitter based on said signal;
   an indicator configured to warn a user when said weapon is directed toward said transmitter; and
   a processor configured to analyze signals from said direction finder in real time and to record signals for post processing, said processor further configured to recognize a problem with identification of the friendly object from the unique identifier signal, wherein the problem includes the unique identifier signal belonging to an object that is not supposed to be located at a location of said transmitter.

2. The system of claim 1, wherein said direction finder includes:
   a first antenna separated by an offset vector from a second antenna;
   a phase detector configured to determine a difference in phase between said signal transmitted by said transmitter as received by said first antenna and said signal as received by said second antenna; and
   a processor configured to determine a difference between a direction of said offset vector and a direction to said transmitter.

3. The system of claim 1, further comprising:
   a database of signals and associated sources and wherein said processor compares said signal with signals in said database for identifying a source.

4. The system of claim 1, wherein said transmitter includes an verification interface configured to verify that the transmitter is being employed by an authorized party, wherein the verification interface is selected from a coded signal, a password, a bio-identifier, requiring a user to identify themselves, and wherein said problem include said transmitter being in a the unique identifier signal indicates that the authorized party has not been verified by the verification interface.

5. The system of claim 1, further comprising:
   a remote control transmitter associated with said direction finder and where said transmitter includes a receiver configured to receive an activation signal from said remote control transmitter and to activate said transmitter in response to receiving said activation signal.

6. The system of claim 1, wherein said direction finder is coupled to a distance detecting device.

7. The system of claim 1, wherein the processor is further configured to warn a user when the problem is recognized.

8. The system of claim 1, wherein the processor is further configured not to activate said indicator when the problem is recognized.

9. A method for preventing friendly fire casualties comprising:
   positioning a transmitter with a unique identifier on a friendly object;

transmitting, with said transmitter, a signal including a unique identifier of the friendly object;

receiving said signal transmitted by said transmitter, said receiving via a direction finder mounted on a weapon;

determining by said direction finder a direction from said weapon to said transmitter and an identity of said friendly object based on said signal;

indicating to a user of said weapon when said weapon is pointing in the direction of said friendly object;

analyzing signals from said transmitter in real time and recording signals for post processing;

recognizing a problem with identification of the friendly object from the unique identifier signal; and verifying an identification of an authorized party using the transmitter and indicating in said signal transmitted by the transmitter when the user not verified.

10. The method of claim 9, wherein said friendly object includes at least one of a friendly soldier, a friendly weapon, an emergency responder and a piece of emergency equipment.

11. The method of claim 9, further comprising:
positioning a second transmitter with a second unique identifier on a second friendly object;
identifying a second signal from said second transmitter;
determining a second direction to said second transmitter based on said second signal;
differentiating between signals from said transmitter and said second transmitter; and
indicating if said weapon is pointing in the direction of said friendly object or said second friendly object.

12. The method of claim 9, wherein said transmitter includes an RF transmitter with a modulator and wherein said transmitting is of a modulated RF signal.

13. The method of claim 9, further comprising:
transmitting data over said signal.

14. The method of claim 9, further comprising:
using said transmitter for at least one of finding said friendly object and identifying said friendly object.

15. The method of claim 9, further comprising warning the user of the weapon of the recognizing the problem with the identification of the object.

16. The method of claim 9, wherein the problem includes that the object associated with the unique identifier signal is not supposed to be at a location of the transmitter.

17. The method of claim 16, wherein the object associated with the unique identifier signal belongs to a military unit that is not involved in a current battle.

* * * * *